(12) United States Patent
Chuang et al.

(10) Patent No.: US 7,649,661 B2
(45) Date of Patent: Jan. 19, 2010

(54) HOLOGRAPHIC STORAGE DEVICE HAVING A REFLECTIVE LAYER ON ONE SIDE OF A RECORDING LAYER

(75) Inventors: Ernest Y. Chuang, Boulder, CO (US); Kevin R. Curtis, Longmont, CO (US)

(73) Assignee: InPhase Technologies, Inc., Longmont, CO (US)

( * ) Notice: Subject to any disclaimer, the term of this patent is extended or adjusted under 35 U.S.C. 154(b) by 103 days.

(21) Appl. No.: 11/485,824

(22) Filed: Jul. 12, 2006

(65) Prior Publication Data

US 2007/0013985 A1 Jan. 18, 2007

Related U.S. Application Data

(60) Provisional application No. 60/699,268, filed on Jul. 13, 2005.

(51) Int. Cl.
  *G03H 1/26* (2006.01)
(52) U.S. Cl. .......................... 359/22; 359/32
(58) Field of Classification Search ............... 359/1–35, 359/107–108
  See application file for complete search history.

(56) References Cited

U.S. PATENT DOCUMENTS

| | | |
|---|---|---|
| 3,653,067 A | 3/1972 | Anderson et al. |
| 3,949,235 A | 4/1976 | Miyazaki et al. |
| 4,318,581 A | 3/1982 | Guest et al. |
| 4,677,629 A | 6/1987 | Lesh |
| 4,715,683 A | 12/1987 | Gregory et al. |
| 5,202,875 A | 4/1993 | Rosen et al. |
| 5,258,860 A | 11/1993 | Schehrer et al. |
| 5,322,747 A | 6/1994 | Hugle |
| 5,339,305 A | 8/1994 | Curtis et al. |
| 5,483,365 A | 1/1996 | Pu et al. |
| 5,510,912 A | 4/1996 | Blaum et al. |
| 5,550,779 A | 8/1996 | Burr et al. |
| 5,592,313 A | 1/1997 | Hart |
| 5,661,577 A | 8/1997 | Jenkins et al. |

(Continued)

OTHER PUBLICATIONS

Ken Anderson et al., "Polytopic Multiplexing", 29 Optics Letters 12, 1402 (Jun. 15, 2004).*

(Continued)

*Primary Examiner*—Stephone B Allen
*Assistant Examiner*—Jennifer L. Doak
(74) *Attorney, Agent, or Firm*—Morrison & Foerster LLP (57) ABSTRACT

A method is provided for manufacturing a holographic medium by recording holograms in transmission geometry, and applying a reflective layer to one side of the holographic recording material after recording is completed (alternatively, for example, the playback system may contain a reflective surface or mirror). For readout, the reference beam is incident to the media from a side opposite the reflective layer. This beam propagates through the media to the reflective layer on the opposite side, and is reflected back through the media for readout of the transmission hologram. The diffracted hologram signal also exits the media on the side without the reflective layer, where it can be recovered by a detector on the same side as the laser source. Alternatively, the readout reference beam is positioned so that the incident beam reads out the hologram, and both the reference beam and diffracted hologram are reflected back through the media.

48 Claims, 8 Drawing Sheets

(a) Recording in transmission geometry without mirror (b) Conjugate readout with mirror Incorporation of mirror in compact drive system

U.S. PATENT DOCUMENTS

| | | | |
|---|---|---|---|
| 5,719,691 | A | 2/1998 | Curtis et al. |
| 5,892,601 | A | 4/1999 | Curtis et al. |
| 5,920,536 | A | 7/1999 | Campbell et al. |
| 5,932,045 | A | 8/1999 | Campbell et al. |
| 5,933,515 | A | 8/1999 | Pu et al. |
| 6,064,586 | A | 5/2000 | Snyder et al. |
| 6,081,912 | A | 6/2000 | Richardson |
| 6,108,110 | A | 8/2000 | Orlov et al. |
| 6,111,828 | A | 8/2000 | McLeod et al. |
| 6,191,875 | B1 | 2/2001 | Curtis et al. |
| 6,272,095 | B1 | 8/2001 | Liu et al. |
| 6,322,933 | B1 | 11/2001 | Daiber et al. |
| 6,482,551 | B1 | 11/2002 | Dhar et al. |
| 6,538,776 | B2 | 3/2003 | Edwards |
| 6,614,566 | B1 | 9/2003 | Curtis et al. |
| 6,721,076 | B2 | 4/2004 | King et al. |
| 6,825,960 | B2 | 11/2004 | Curtis et al. |
| 6,914,704 | B2 | 7/2005 | Shuman |
| 7,092,133 | B2 | 8/2006 | Anderson et al. |
| 7,116,626 | B1 | 10/2006 | Woods et al. |
| 2003/0039001 | A1* | 2/2003 | King et al. ............. 359/35 |
| 2004/0179251 | A1* | 9/2004 | Anderson et al. ........... 359/3 |
| 2005/0036182 | A1 | 2/2005 | Curtis et al. |
| 2005/0254108 | A1 | 11/2005 | Chuang et al. |
| 2005/0270609 | A1 | 12/2005 | Chuang et al. |
| 2005/0286388 | A1 | 12/2005 | Ayres et al. |

OTHER PUBLICATIONS

Author Unknown (Date Unknown). "Holographic Confocal Microscope," located at <http://fyzika.fme.vutbr.cz/~chmelik/hclm/Parmode.htm>, last visited on Nov. 15, 2006, 4 pages.

Author Unknown. "How Does A Confocal Microscope Work?," located at <http://www.physics.emory.edu/weeks/confocal/>, last visited on Nov. 16, 2006, 6 pages.

Barbastathis, G. et al. (Jun. 15, 1999). "Confocal Microscopy with a Volume Holographic Filter," *Optic Letters* 24(12):811-813.

Barbastathis, G. et al. (2000). "Volume Holographic Multiplexing Methods," In *Holographic Data Storage*, Springer-Verlag, Coufal, H. et al, eds., pp. 21-62.

Bryanston-Cross, P. (2002). "Technical Research: Holography," provided by Optical Engineering Laboratory, located at <http://www.eng.Warwick.ac.uk/oel/previous/holoviz/report/holoviz/ground.htm>, last visited on Nov. 20, 2006, 9 pages.

Burr, G. W. et al. (Apr. 1, 2000). "Multiplexed Phase-Conjugate Holographic Data Storage with a Buffer Hologram," *Optics Letters* 25(7):499-501.

Burr, G. W. et al. (2001). "Using Volume Holograms to Search Digital Databases," *SPIE Conference on Three-and Four-Dimensional Optical Data Storage*, Paper 4459: 311-322.

Chuang, E. et al. (2002). "Holographic ROM System for High-Speed Replication," *Joint International Symposium on Optical Memory and Optical Data Storage Technical Digest*, Waikoloa, HI, Jul. 7-11, 2002, pp. 144-146.

Curtis, K. et al. (Jul. 1, 1994). "Method for Holographic Storage Using Peristrophic Multiplexing," *Optics Letters* 19(13):993-994.

Curtis, K. et al. (Dec. 1994). "Three-Dimensional Disk Based Optical Correlator," *Optical Engineering* 33(12):4051-4054.

Dallas, W. J. (2001). "Part II: Chapter One: Holography in a Nutshell," pp. 1-11.

Decision of the Technical Board of Appeal 3.4.2 of Dec. 19, 2001. U.S. Application No. 95104785.1, Publication No. 0676634 for Optical Inspection of Container Dimensional Parameters, by Owens-Brockway Glass Container, Inc., located at <http://legal.european-patent-office.org/dg3/biblio/t000041eu1.htm>, Nov. 20, 2006, 10 pages.

European Search Report mailed Oct. 13, 2006, issued for EP 03257404, two pages.

Gower, M. et al. eds. (1994). Optical Phase Conjugation Springer-Verlag, pp. vii-xii. (Table of Contents Only).

Kostuk, R. K. et al. (2000). "Beam Conditioning Techniques for Holographic Recording Systems," *Holographic Data Storage*, Coufal, H. J. et al., eds., Storage Springer-Verlag, pp. 259-269.

Li, H-Y. S. (1994). "Storage Density of 3-D Holographioc Disks" Chapter 4 in "Photorefractive 3-D Disks for Optical Data Storage and Artificial Neural Networks," published by UMI Dissertation Services, pp. 78-112.

Michalski, J. (Date Unknown). "What is Telecentricity?," provided by Edmund Industrial Optics®, located at <http://www.edmundoptics.com>, last visited on Nov. 15, 2006, 4 pages.

Miller, J. W. V. (Feb. 1999). "Project Abstract: Development of Enhanced Measurement Techniques for Tool Gauging," http://www.engin.umd.umich.edu/hpceep/reports/1999/miller99.html>>, last visited on Nov. 16, 2006, 1 page.

Minsky, M. (1988). "Memoir on Inventing the Confocal Scanning Microscope," located at <<http://www.ai.mit.edu/people/minsky/paper/confocal.microscope.txt>>, last visited on Nov. 16, 2006, 6 pages.

Piazzolla, S. et al. (May 1, 1992). "Single-Step Copying Process for Multiplexed Volume Holograms," *Optic Letters* 17(9):676-678.

Rhodes, W. T. (1979). "Hologram Copying," Chapter 9 *In The Handbook of Optical Holography*, Caulfield, H. J., ed, Academic Press, Inc., pp. 373-377.

Saito, K. et al. (1998). "Holographic 3-D Disk Using In-Line Face-to-Face Recording," *Optical Media Laboratory, Sony Corporation*:162-164.

Schnoes, M. et al. (Date Unknown). "Holographic Data Storage Media for Practical Systems," 9 pages.

Tao, S. et al. (Jun. 1, 1993). "Spatioangular Multiplexed Storage of 750 Holograms in an $FeLiNbO_3$ Crystal," *Optics Letters* 18(11):912-914.

\* cited by examiner

Figure 1

Figure 2. Transmission geometry (prior art)

Figure 3. Reflection geometry (prior art)

Figure 4. Media with reflection layer, during recording (prior art)

Figure 5. Basic hologram recording system: Transmission geometry

Figure 6. Normal readout (a) forward, (b) conjugate. (relative to directions of recording shown in Figure 4)

Figure 7. Example readout configurations with mirror (a) Forward readout by incident beam  (b) Conjugate readout by reflected beam (a) Recording in transmission geometry without mirror (b) Conjugate readout with mirror Figure 8. Incorporation of mirror in compact drive system

HOLOGRAPHIC STORAGE DEVICE HAVING A REFLECTIVE LAYER ON ONE SIDE OF A RECORDING LAYER

CROSS-REFERENCE TO RELATED APPLICATIONS

The present application claims the benefit of earlier filed provisional application U.S. Ser. No. 60/699,268, entitled "SYSTEMS AND METHODS FOR COMPACT TRANSMISSION HOLOGRAM READOUT," filed on Jul. 13, 2005, which is incorporated herein by reference in its entirety.

BACKGROUND

1. Field

The invention relates generally to holographic data storage media and systems, and more particularly to methods and systems for recording and/or reading holographic storage media having a reflective layer for readout (or playback).

2. Description of Related Art

Holographic data storage systems store information or data based on the concept of a signal beam interfering with a reference beam at a holographic storage medium. The interference of the signal beam and the reference beam creates a holographic representation, i.e., a hologram, of data elements as a pattern of varying refractive index and/or absorption imprinted in a volume of a storage or recording medium such as a photopolymer or photorefractive crystal. Combining a data-encoded signal beam, referred to as an object beam, with a reference beam can create the interference pattern at the storage medium. A spatial light modulator (SLM) or lithographic data mask, for example, may create the data-encoded signal beam. The interference pattern induces material alterations in the storage medium that generate the hologram.

The formation of the hologram in the storage medium is generally a function of the relative amplitudes and polarization states of, and phase differences between, the signal beam and the reference beam. The hologram is also dependent on the wavelengths and angles at which the signal beam and the reference beam are projected into the storage medium. After a hologram is created in the storage medium, projecting the reference beam into the storage medium interacts and reconstructs the original data-encoded signal beam. The reconstructed signal beam may be detected by using a detector, such as a CMOS photo-detector array or the like. The recovered data may then be decoded by the photo-detector array into the original encoded data.

Figure 1:
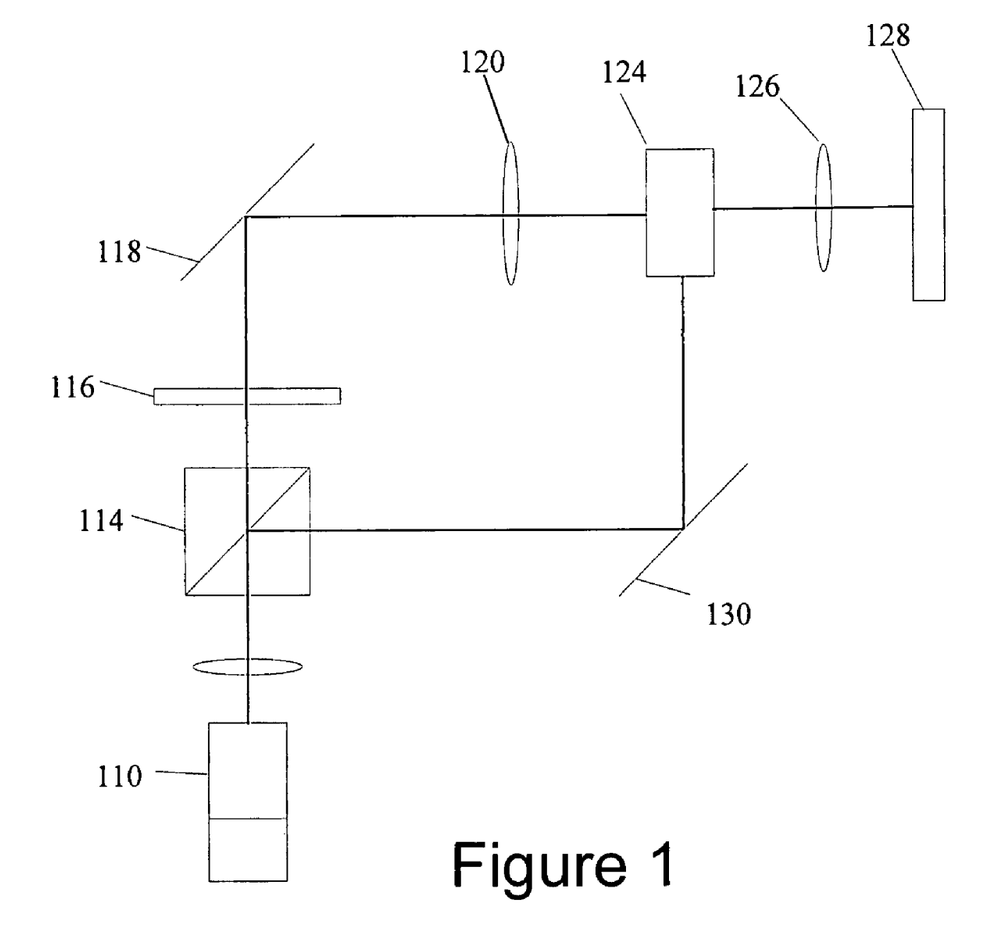
FIG. 1 illustrates an exemplary holographic recording and reading system.

A basic holographic system is illustrated in FIG. 1. The holographic storage system includes a light source 110, for example, a laser for providing a coherent beam of light. A beam splitter 114 is positioned to split the laser beam into an object beam and a reference beam. The object beam is directed to an SLM or data mask 116 where it is encoded with information as a two-dimensional image and directed to the recording storage medium 124 by mirror 118 and lens 120 where it interferes with the reference beam directed via mirror 130. A complex interference pattern is recorded in the storage medium 124 where the object beam and reference beam interact. After a first image or layer is recorded, the system may be modified to enable additional images to be recorded in storage medium 124. For example, by modifying the angle and/or wavelength of the reference beam, successive images may be recorded in the storage medium 124.

A particular image may be retrieved from recording medium 124 with a reference beam similar to the original reference beam used to store the image. The light is diffracted by storage medium 124 according to the stored hologram and the two-dimensional image that was stored in recording medium 124 is directed by lens 126 to photo-detector array 128.

Figure 2:
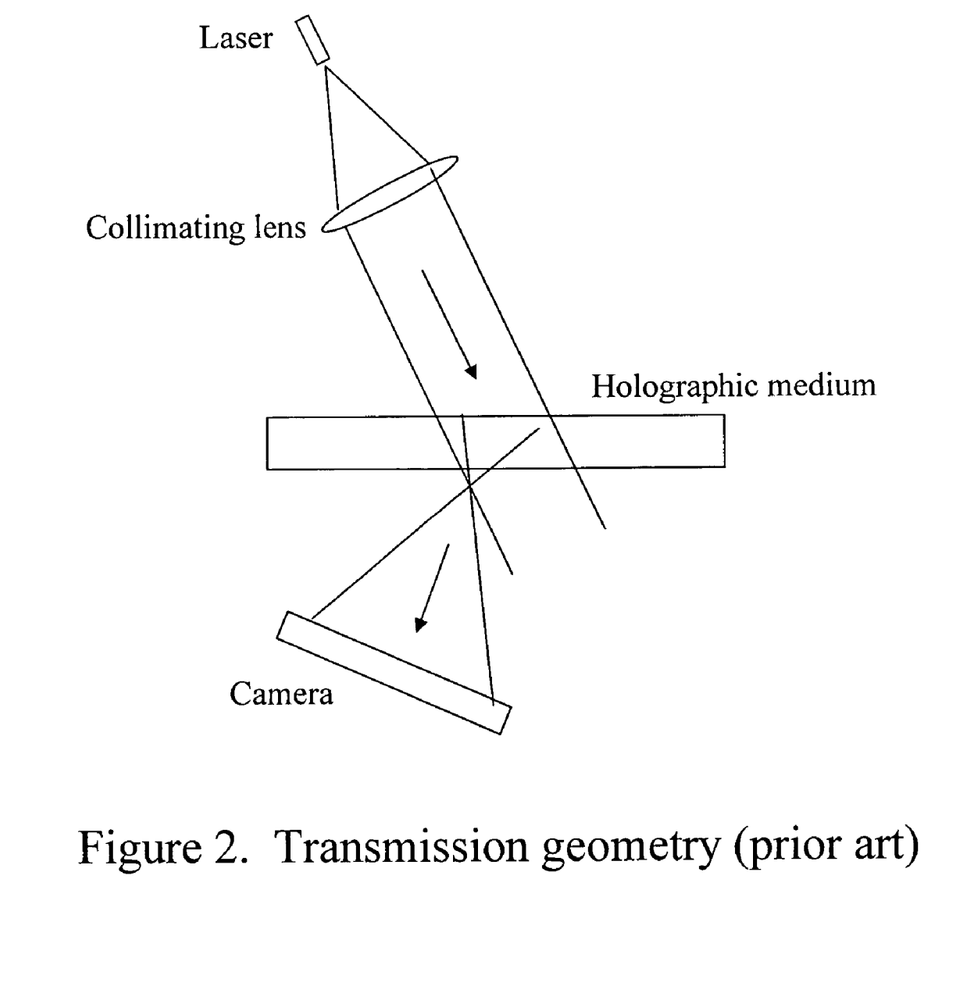
FIG. 2 illustrates an exemplary transmission geometry holographic reading method and system.

Two basic holographic system geometries include transmission and reflection geometry. In transmission geometry, shown in FIGS. 1 and 2, the diffracted light from the hologram exits the media from the opposite side from the incident reference beam. The light source, e.g., a laser source, and the camera for detection are therefore disposed on opposite sides of the media. For recording at different spatial locations on the media, such systems are typically limited to moving the media because of the complexity of synchronously moving the laser source and camera on both sides of the media, if the media were kept stationary.

Figure 3:
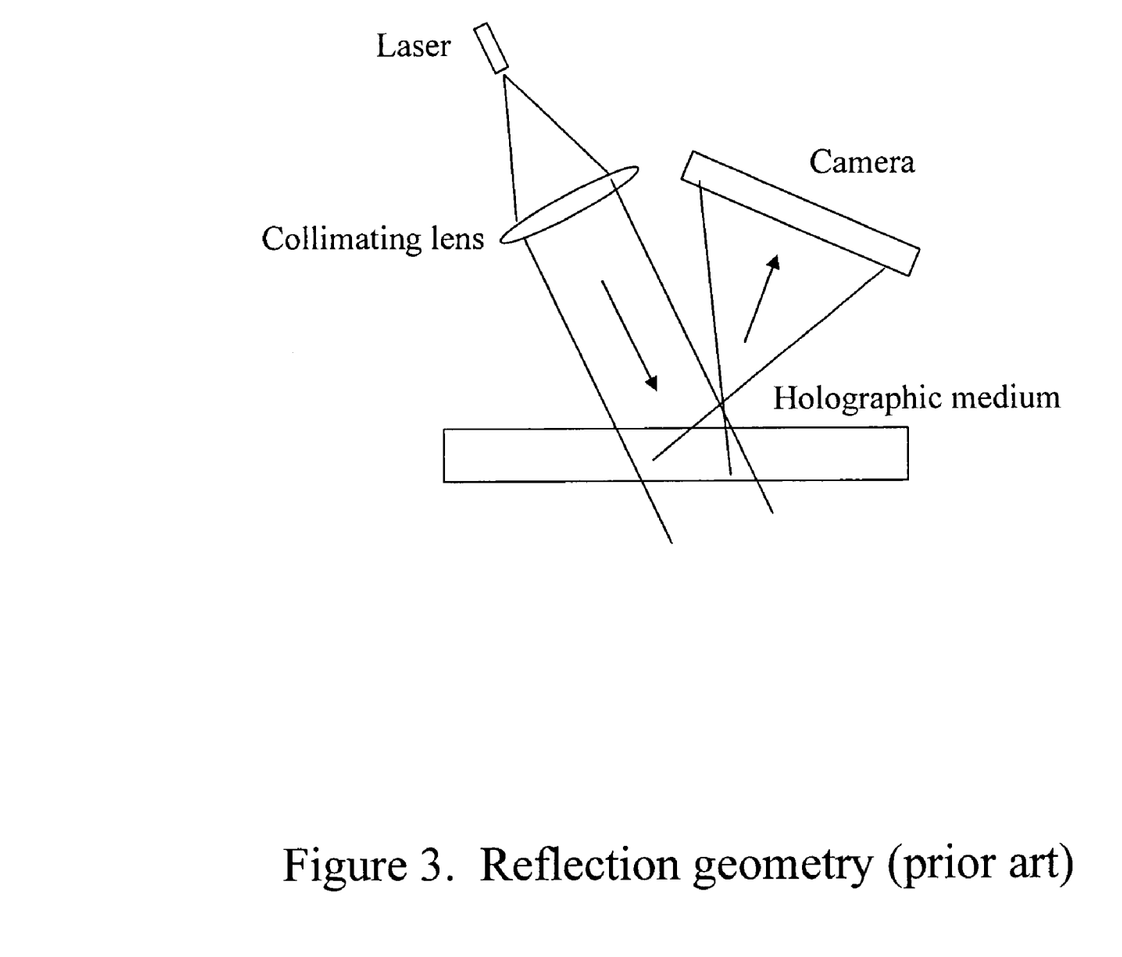
FIG. 3 illustrates an exemplary reflection geometry holographic reading method and system.

In reflection geometry, shown in FIG. 3, the diffracted light from the hologram exits the media from the same side as the incident reference beam. Because the laser source and camera are on the same side of the media in this case, this geometry is more flexible for either moving the media or moving the laser source and camera (e.g., together on a shared head or stage) in order to access different locations on the media.

Holograms recorded in reflection geometry, however, are generally more sensitive than transmission geometry holograms to effects such as shrinkage or anisotropic thermal expansion of the media. Such media distortion leads to detuning of the beam angles needed to properly read out the holograms, and are about an order of magnitude larger for reflection geometry holograms than for transmission geometry. For high bandwidth object beams, which span a wide angular range, different parts of the image can have significant variation in detuning angles, so that it may not be possible to fully recover the entire data page. The magnitude of the variation is smaller for transmission geometry, and furthermore, it can be compensated almost fully with a proper combination of readout beam angle and wavelength adjustments. For reflection geometry, even with an optimal adjustment of angle and wavelength, the entire data page may not be recoverable.

Figure 4:
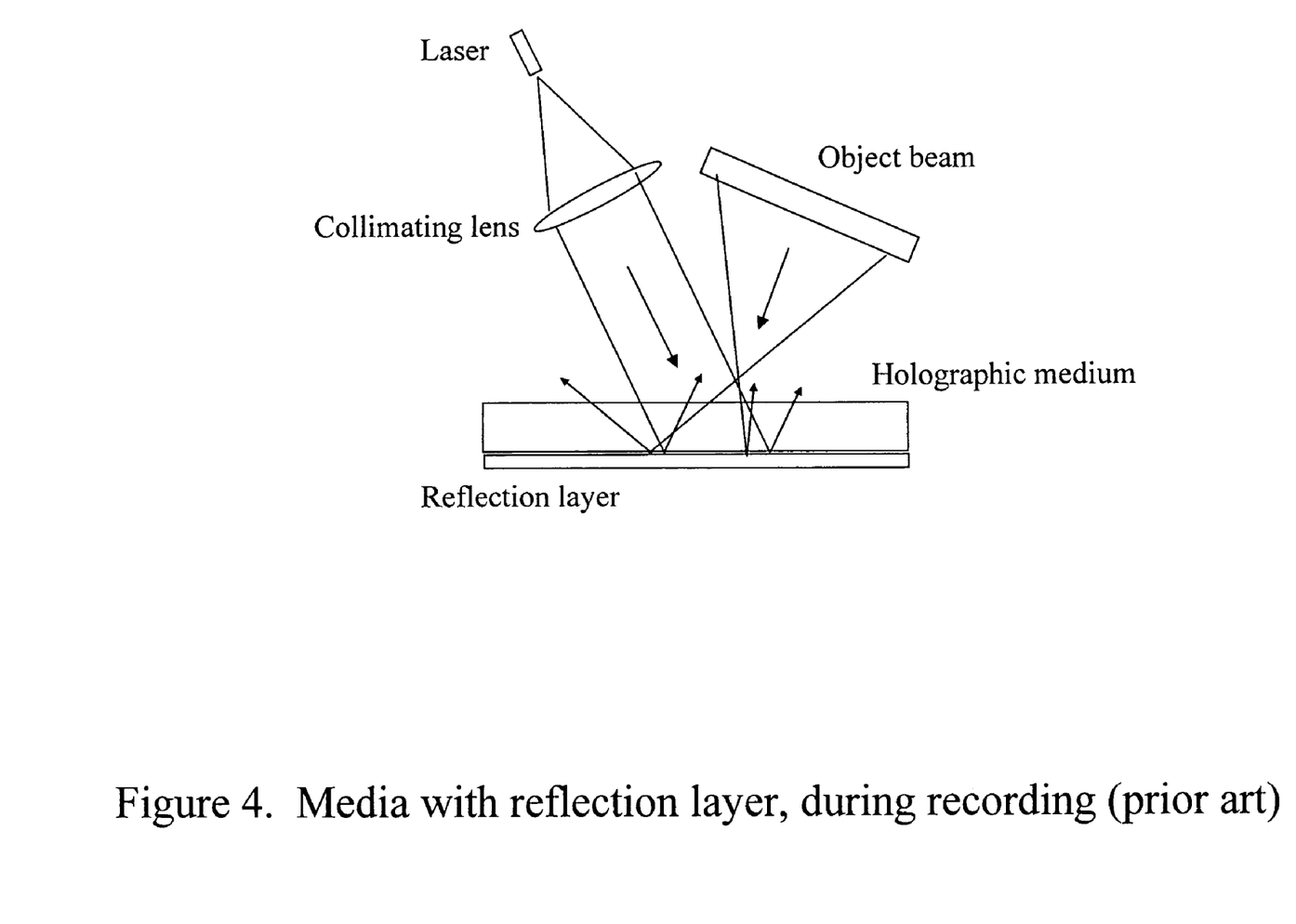
FIG. 4 illustrates an exemplary method and system for recording to a holographic storage medium including a reflection layer.

One architecture variation which has been proposed previously is to use media with a reflective layer on one side, such as shown in FIG. 4. Such an example is described in Saito, K. and Horimai, H. (1998) "Holographic 3-D Disk using In-Line Face-to-Face Recording", Optical Media Laboratory, Sony Corporation, pp. 162-164, the entire content of which is hereby incorporated by reference. This has a similar benefit of reflection geometry, i.e., having all components on one side of the media; however, the reflective layer is present for both recording and readout. This has the consequence that during recording, the hologram area has a mixture of incident and reflected beams for both the reference and object beams. As a result, both transmission and reflection hologram components are recorded in the same volume. As described earlier, under shrinkage or thermal expansion, the reflection and transmission hologram components will behave differently with different degrees of detuning. This can lead to interference and distortion between the transmission and reflection components of the reconstructed hologram.

Another prior art variation includes the use of a reflective layer together with a polarization shifting layer. Such an example is described, for example, in U.S. Pat. No. 6,721,076, to King, B., Anderson, K., and Curtis, K., entitled "SYSTEM AND METHOD FOR REFLECTIVE HOLOGRAPHIC STORAGE WITH ASSOCIATED MULTIPLEXING TECHNIQUES," the entire content of which is hereby incorporated by reference. In this case, both reflected beam polarizations are rotated upon reflection, so that transmission hologram components are recorded by both the incident and reflected beam pairs, but no reflection hologram components are recorded. This avoids the possible negative interaction between transmission and reflection components of the reconstructed hologram, but generally benefits from the incorporation of a potentially costly polarization shifting layer in the media fabrication. Also, even though no holograms are recorded between beam components with crossed polarizations, the presence of light from the reflected beams in the same volume where the hologram between the incident beams is being recorded, and vice versa, may reduce the modulation depth of the holograms, resulting in wasted dynamic range of the media.

BRIEF SUMMARY

According to one example described herein a holographic storage medium is provided. The holographic storage medium comprises a holographic recording layer having at least one hologram recorded therein, and a reflective layer disposed on one side of the holographic recording layer, wherein a reference beam incident on the holographic recording layer from a side opposite the reflective layer results in a hologram diffracted from either the reflected beam or from the incident beam, but not from both. The hologram recorded therein may be advantageously recorded via transmission geometry and is adapted to be readout in a compact system including the light source and detector on the same side of the medium, and in one example, on a single head or actuator.

Holograms recorded with the holographic storage medium may be recorded via one or any combination of polytopic, angle, wavelength, correlation, phase-code, confocal, peristrophic multiplexing. Additionally, at least one hologram may include user data having error correction features, such as registration marks, error fields, or the like, header and servo data, etc.

The holograms may also be recorded such that detection may include a lensless readout, e.g., without optics or lenses disposed between the media and detector. In one example, the recovered holographic image location is within 5 centimeters of the storage medium.

In another aspect provided herein, a method for manufacturing a holographic storage medium includes recording at least one hologram to a holographic recording material using transmission geometry and disposing a reflective layer on one side of the storage medium after recording the at least one hologram. The reflective layer may be disposed on a surface associated with the holographic recording material by a metal sputtering process or other suitable process. Additionally, the at least one hologram recorded to the holographic recording material may be replicated from a master hologram in another storage medium, e.g., a master data mask or the like.

In another aspect provided herein a playback system includes a light source operable to produce a coherent light beam, a holographic storage medium comprising a reflective layer disposed on one side of a holographic recording layer, wherein the coherent light beam is directed to a side of the holographic recording layer opposite the reflective layer, and a detector operable to detect a diffracted hologram from the side opposite the reflective layer, wherein the detected hologram is diffracted from either the incident beam or the beam reflected back into the media by the reflective layer, but not from both beams.

The playback system may further include one or more of a polytopic filter, a means for changing the angle of the incident beam on the storage medium (which may include at least one lens on an actuator or at least one mirror on an actuator) in one or two dimensions. The playback may further include a means for changing the wavelength of the incident beam on the storage medium (which may include at least one element that is tunable in wavelength).

In another aspect provided herein a playback system includes a light source for producing a coherent light beam, wherein the coherent light beam is directed incident to a first side of a holographic storage medium during a playback operation, a surface operable to reflect at least a portion of the coherent light beam incident to and transmitted through the storage medium back into the storage medium from a second side, the second side generally opposite the first side, and a detector for detecting diffracted holograms on the same side of the storage medium as the incident beam, where the detected hologram is diffracted from either the incident beam or the beam reflected back into the media by the reflective layer, but not from both beams.

Additionally, the light source and the detector may be contained in a head that can move over the storage medium area. Further, the storage medium may move relative to the incident light.

The present invention is better understood upon consideration of the detailed description below in conjunction with the accompanying drawings and claims.

DETAILED DESCRIPTION

Methods and systems are provided for holographic storage media recording and reading including, for example, holographic read only media or HROM media. The following description is presented to enable any person of ordinary skill in the art to make and use the various examples. Descriptions of specific techniques and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown, but is to be accorded the widest scope consistent with the principles and features disclosed herein.

In one aspect of this invention, a method is provided for manufacturing a holographic medium by first recording holograms in transmission geometry, and then applying a mirror or reflective layer to one side of the holographic recording material after recording is completed. For readout, the reference beam is incident to the media from a side opposite the reflective layer. This beam propagates undiffracted through the media to the reflective layer on the opposite side, and is then reflected back through the media in the proper direction for readout of the transmission hologram. The diffracted hologram signal also exits the media on the side without the reflective layer, where it can be recovered by a detector on the same side as the laser source. Alternatively, the readout reference beam may be positioned so that the incident beam reads out the hologram and both the reference beam and diffracted hologram signal are reflected back through the media. Because the reflective layer was not present for recording, neither beam will undergo additional diffraction on the return pass through the media.

In another aspect of the invention, a reflective layer is not directly applied or disposed with the holographic medium, but a holographic readout system, e.g., a playback or read drive, comprises a mirror (or reflective surface) opposite to the laser source and camera, wherein the media is disposed therebetween. The mirror provides a similar function as a reflective layer on the media, as described above to readout holograms recorded via transmission geometry.

Various examples and aspects described here may give the system the readout robustness of transmission geometry holograms with the compact drive design of reflection geometry, in which the main drive components are on the same side of the media. In particular, the reflective layer or mirror surface is present for readout only, after the recording of holograms in transmission geometry is completed without the reflective layer. This avoids the mixture of transmission and reflection hologram components that would be present if recording were performed with the reflective layer in place, as with prior art systems. Furthermore, there is no loss of modulation depth from having both incident and reflected beam components superimposed in the recording volume, and this can be accomplished using a simple mirror layer, instead of a more complex and costly polarization shifting layer Various other methods and systems may be combined with the aspects and examples of the invention described herein. For example, various multiplexing techniques, optical systems, relay systems, recording methods, data masks, detector systems and methods, and the like are contemplated for use with the examples described herein. For example, the following copending patent applications describe various recording and readout methods and systems which may be used in conjunction with the invention as described herein: U.S. patent application Ser. Nos. 10/658,055, entitled, "METHODS FOR IMPLEMENTING PAGE BASED HOLOGRAPHIC ROM RECORDING AND READING," filed Sep. 8, 2003; 11/132,002, entitled "HOLOGRAPHIC RECORDING SYSTEM HAVING A RELAY SYSTEM," filed May 17, 2005; and 11/131,601, entitled "METHODS AND SYSTEMS FOR RECORDING TO HOLOGRAPHIC STORAGE MEDIA," filed May 17, 2005, all of which are incorporated herein by reference in their entirety.

Figure 5:
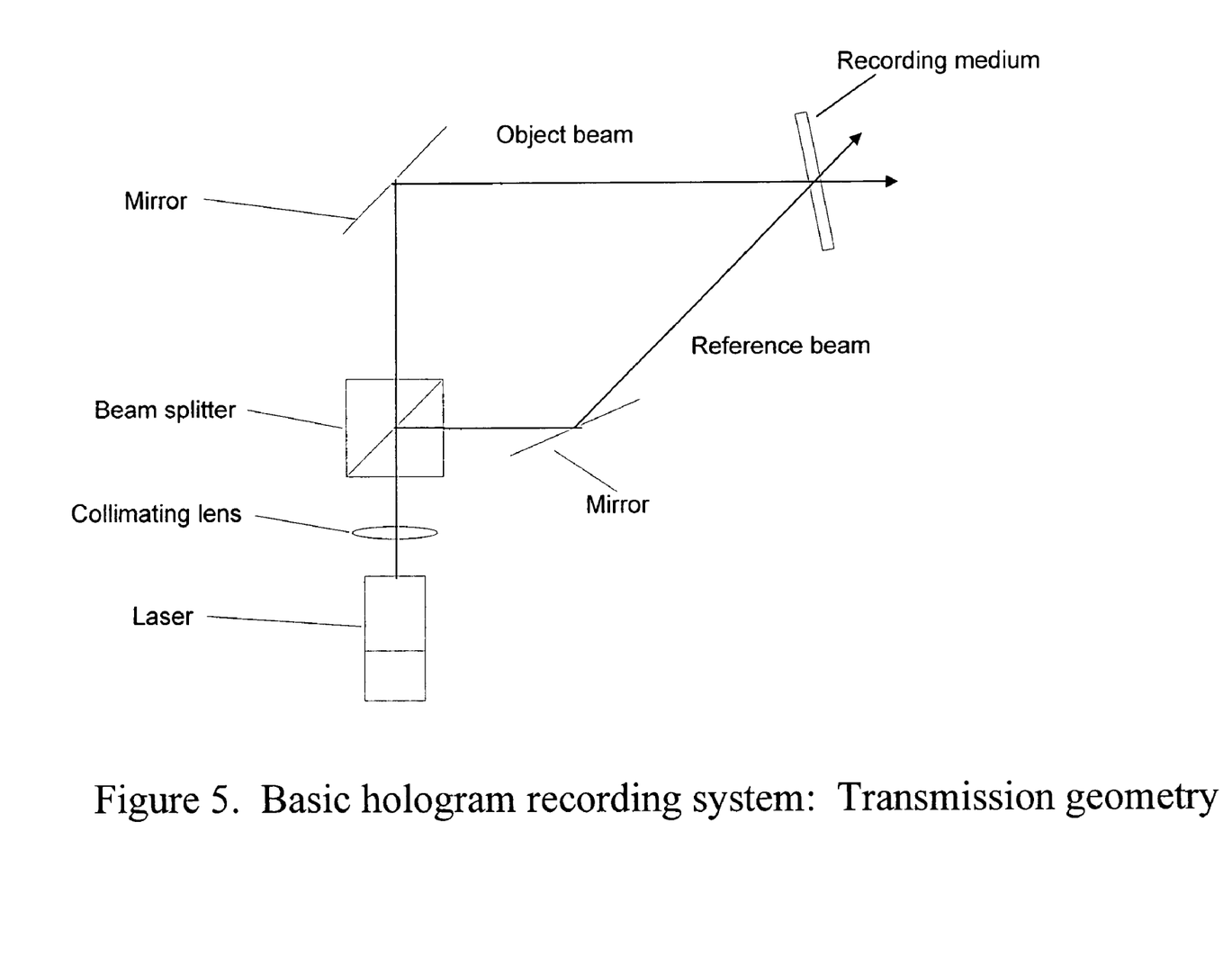
FIG. 5 illustrates a basic holographic recording system for transmission geometry.

FIG. 5 illustrates a basic configuration for recording holograms in the transmission geometry. The recording system includes a coherent light source, such as a laser, which is split into an object beam and a reference beam by a beam splitter. The object and reference beams are directed to a holographic storage medium where a hologram is recorded. More than one hologram may be stored in the same volume of media by using one or more multiplexing techniques, such as by angle, wavelength, polytopic, correlation, phase-code, confocal, and peristrophic multiplexing methods. The layout shown is for the transmission geometry, in which both beams enter the storage medium from the same side.

Figure 6:
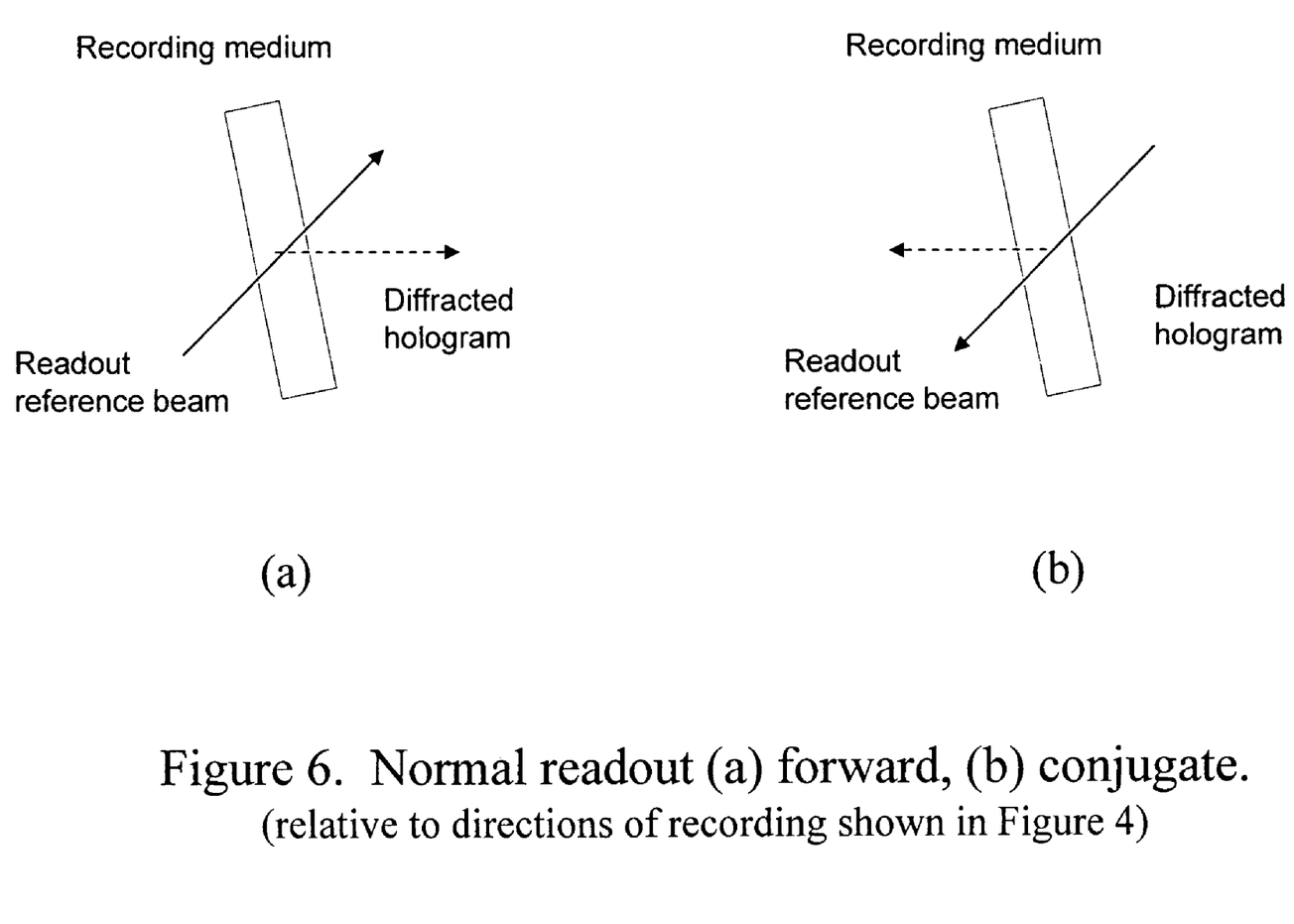
FIGS. 6A and 6B illustrate readout of a hologram by forward and conjugate methods respectively.

Normal playback of such a hologram can performed using either forward or phase conjugate readout configurations, as shown in FIGS. 6A and 6B. Note that with both readout configurations, the diffracted hologram exits the storage medium from the opposite face from which the readout beam entered the medium, so that the device (such as a camera) for recovering the diffracted hologram is typically placed on the opposite side of the medium from the coherent light source.

Figure 7:
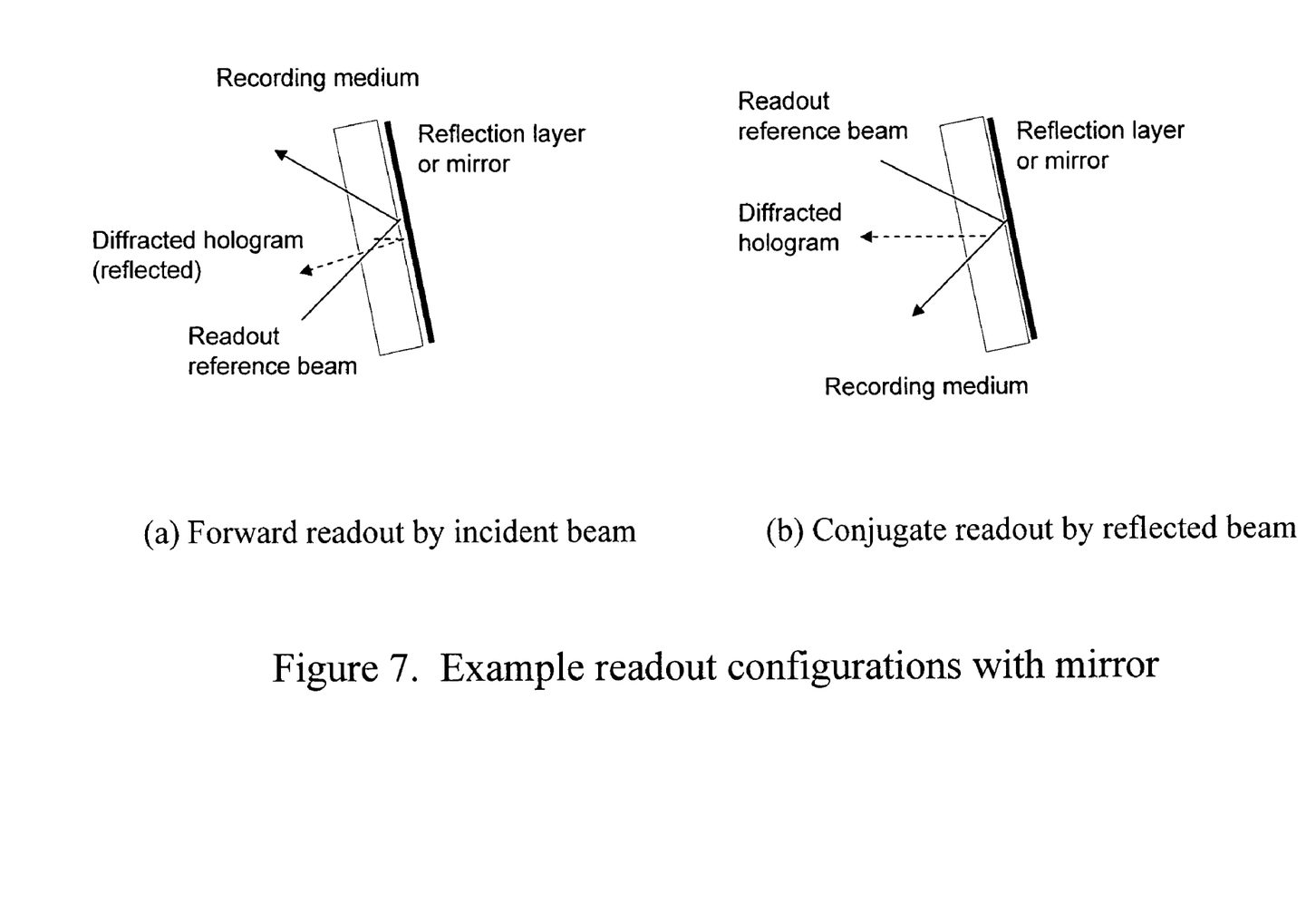
FIGS. 7A and 7B illustrate exemplary readout configuration with a reflective material included with the recording medium or a reflective surface (e.g., a mirror) disposed adjacent the recording medium respectively.

In one aspect of the invention, a reflective layer is applied to the storage medium after recording is complete. The reflective layer may be applied to either side of the storage medium, depending on whether forward or conjugate readout is desired, and depending on whether the hologram should be read by the incident beam or by the reference beam after being reflected from the reflective layer. FIGS. 7A and 7B shows two example combinations. In the case where the hologram is read by the incident beam, both the reference beam and diffracted hologram are reflected by the reflective layer, but neither reflected beam should undergo additional hologram diffraction on the return pass through the medium if the geometry and beam angles are chosen properly.

In one example, the reflective layer is sputter deposited, but any suitable method is contemplated such as spin-coating, attaching a reflective or mirror layer (fabricated separately from the media) after recording, or the like. Additionally, the reflective layer may include any suitable reflective material such as Aluminum, Silver, Gold, Chromium, and the like as well as reflective dielectric coatings or layers, such as $MgF_2$, $SiO_2$, and $TiO_2$ or the like.

In one example, the holographic storage medium may include a card medium such as a high performance card storage device or the like. Alternatively, the storage medium may include disc media similar to or different from conventional CD or DVD media, tape, or any other convenient format in which optical media may be fabricated. Generally, the holographic storage medium includes a photopolymer on or between protective substrates. The protective substrates are advantageously selected from glass, sapphire, polycarbonate, poly(methyl methacrylate) or PMMA, plastic, quartz, or other suitable material that is generally transparent to the wavelength of light being used, and which has adequate mechanical properties in the holographic storage system. Alternatively, the storage medium may be enclosed at least partially within a cartridge or other protective structure.

The photopolymer layer may include a photopolymer material that is capable of recording the desired interference pattern. One exemplary holographic medium includes Tapestry™ media manufactured by InPhase Technologies, but any volumetric media capable of recording holograms may be used. Other examples of photopolymers and storage media include those described in U.S. Pat. No. 6,482,551, which is hereby incorporated herein in its entirety by reference. It is also desirable that the optical quality of the media be fairly high, e.g., <4 wavelength of power per $cm^2$, to achieve good image reconstruction and good Bragg selectivity. U.S. Pat. No. 5,932,045 describes an exemplary method for fabricating exemplary media and is incorporated herein in its entirety by reference.

In another aspect of this invention, instead of including a reflective layer with the storage medium, a mirror (or other suitable reflective surface) may be contained in the playback system to act as a substitute for a reflective layer with the medium.

Figure 8:
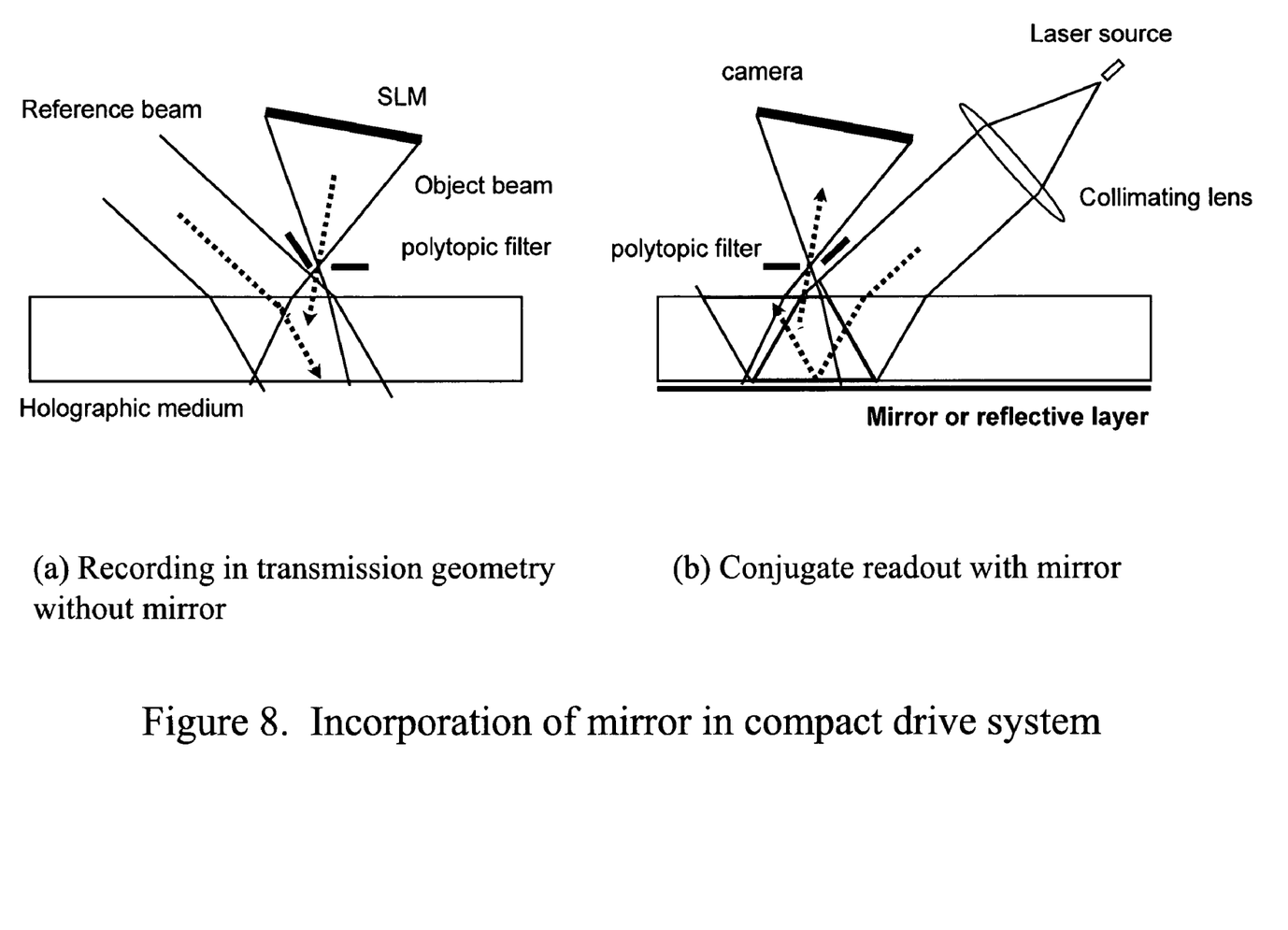
FIGS. 8A and 8B illustrate an exemplary recording and readout system for recording in transmission geometry and readout with a reflective layer or mirror respectively.

FIGS. 8A and 8B illustrate a specific example of using this invention for a compact holographic drive system. Holograms are recorded in the transmission geometry between a reference beam and light converging from a spatial light modulator as shown in FIG. 8A. The spatial light modulator may contain and record a data page with user data, error correction, header and servo information and the like. The system may contain a filtering aperture for polytopic multiplexing (an aperture at a Fourier plane of the light from the diffracted hologram), and holograms may be additionally multiplexed such as by angle or wavelength.

For readout, a reflective layer is present either with/on the media or in the drive, and the readout beam is directed such that the reflected beam reads out the hologram in the conjugate direction. In conjugate readout, the hologram reverse-propagates to reform the original input image without the need for any lenses for imaging. This configuration allows all the major components to be on the same side of the media, so that they can all be contained in a compact head that moves over the media to access different locations, while preserving the advantages of transmission hologram readout.

Multiplexed holograms can be read out in a compact way by changing beam angle, such as by having either the collimating lens on an actuator or including one or more mirrors on actuators, or in wavelength, such as by using wavelength-tunable lasers and/or a laser array.

Various examples herein may include multiplexing multiple pages to get to high storage density in a holographic storage media or holographic master data mask. For example, wavelength, angle, correlation, phase-code, confocal (storing at different distances from center of media), peristrophic, polytopic, and the like. Further, one or more of the multiplexing technique may be combined to increase storage density, e.g., (wavelength, confocal), (angle, confocal), (wavelength, polytopic) or all three. Additionally, data page(s) and layer(s) may be combined with visible image(s) for security purposes and the like.

Other exemplary holographic data storage systems that may be used in conjunction with various aspects of the present invention include those described in U.S. Pat. Nos. 5,920,536 entitled, "Method and Apparatus for Holographic Data Storage System," 5,719,691, entitled, "Phase Correlation Multiplex Holography," and 6,191,875 entitled, "Process for Holography Using Reference Beam Having Correlated Phase Content," all of which are incorporated herein by reference in their entirety.

The above detailed description is provided to illustrate exemplary embodiments and is not intended to be limiting. It will be apparent to those of ordinary skill in the art that numerous modification and variations within the scope of the present invention are possible. For example, various methods of recording in holographic media and reading from holographic media may be used in holographic storage systems in isolation or in combination with other methods. Additionally, the apparatus and methods described herein should not be limited to any particular holographic storage system, for example, the methods and systems are generally applicable with various system configurations and multiplexing methods. Accordingly, the present invention is defined by the appended claims and should not be limited by the description herein.

Finally, particular examples have been discussed and how these examples are thought to address certain disadvantages in related art. This discussion is not meant, however, to restrict the various examples to methods and/or systems that actually address or solve the disadvantages.

The invention claimed is:

1. A holographic storage medium comprising:
a holographic recording layer having at least one hologram recorded therein, wherein a first hologram is recorded with a recording reference beam at a first angle relative to the holographic recording layer; and
a reflective layer disposed on one side of the holographic recording layer, wherein in response to a readout reference beam incident the holographic recording layer from a side opposite the reflective layer such that the angle of the incident readout reference beam or the angle of the reflected readout reference beam matches the first angle relative to the holographic recording layer, a hologram diffracts from either the reflected beam or from the incident beam, but not from both.

2. The storage medium of claim 1, wherein the holographic storage medium contains holograms recorded by polytopic multiplexing.

3. The storage medium of claim 1, wherein the holographic storage medium contains holograms recorded by angle multiplexing.

4. The storage medium of claim 1, wherein the holographic storage medium contains holograms recorded by wavelength multiplexing.

5. The storage medium of claim 1, wherein the holographic storage medium contains holograms recorded by correlation multiplexing.

6. The storage medium of claim 1, wherein the holographic storage medium contains holograms recorded by phase-code multiplexing.

7. The storage medium of claim 1, wherein the holographic storage medium contains holograms recorded by confocal multiplexing.

8. The storage medium of claim 1, wherein the holographic storage medium contains holograms recorded by peristrophic multiplexing.

9. The storage medium of claim 1, wherein at least one hologram contains user data with error correction features.

10. The storage medium of claim 9, wherein the recovered holographic image location is within 5 centimeters of the storage medium.

11. The storage medium of claim 1, wherein at least one hologram contains header and servo data.

12. The storage medium of claim 1, wherein at least one hologram can be imaged without optics or lenses.

13. The storage medium of claim 1, wherein the storage medium is shaped as a card.

14. The storage medium of claim 1, wherein the storage medium is shaped as a disk.

15. A method for manufacturing a holographic storage medium, the method comprising:
recording a hologram to a holographic recording material using transmission geometry, the hologram recorded with a recording reference beam at a first angle relative to the holographic recording layer; and
disposing a reflective layer on one side of the storage material after recording the at least one hologram, wherein the hologram is readout in response to a readout reference beam incident the holographic recording material such that the angle of the incident readout reference beam or the angle of the reflected readout reference beam from the reflective layer matches the first angle relative to the holographic recording layer for readout of the hologram.

16. The method of claim 15, wherein the reflective layer is applied to a surface associated with the holographic recording material by a metal sputtering process.

17. The method of claim 15, wherein at least one hologram is recorded by polytopic multiplexing.

18. The method of claim 15, wherein at least one hologram is recorded by angle multiplexing.

19. The method of claim 15, wherein at least one hologram is recorded by wavelength multiplexing.

20. The method of claim 15, wherein at least one hologram is recorded by correlation multiplexing.

21. The method of claim 15, wherein at least one hologram is recorded by phase-code multiplexing.

22. The method of claim 15, wherein at least one hologram is recorded by confocal multiplexing.

23. The method of claim 15, wherein at least one hologram is recorded by peristrophic multiplexing.

24. The method of claim 15, wherein at least one hologram is replicated from a master hologram in another storage medium.

25. A playback system comprising:
a light source operable to produce a coherent light beam;
a holographic storage medium comprising a reflective layer disposed on one side of a holographic recording layer, wherein the coherent light beam is directed to a side of the holographic recording layer opposite the reflective layer; and
a detector operable to detect a hologram from the side opposite the reflective layer, wherein the detected hologram is readout in response to a readout reference beam incident the holographic recording material such that the angle of the incident readout reference beam or the angle of the reflected readout reference beam from the reflective layer matches a recording reference beam angle relative to the holographic recording layer.

26. The playback system of claim 25, further including a means for shaping the coherent light into a plane wave beam.

27. The playback system of claim 25, further including a polytopic filter.

28. The playback system of claim 25, further including a means for changing the angle of the incident beam on the storage medium.

29. The playback system of claim 28, wherein the means for changing the angle of the incident beam includes at least one lens on an actuator.

30. The playback system of claim 25, wherein the means for changing the angle of the incident beam includes at least one mirror on an actuator.

31. The playback system of claim 25, wherein the means for changing the angle of the incident beam allows control of the beam angle in two dimensions.

32. The playback system of claim 25, further including a means for changing the wavelength of the incident beam on the storage medium.

33. The playback system of claim 25, wherein the means for producing coherent light includes at least one element that is tunable in wavelength.

34. The playback system of claim 25, wherein the means for detecting holograms is performed without any lenses between the storage medium and the detection device.

35. The playback system of claim 25, wherein the means for producing coherent light and the means for detecting holograms are contained in a head that can move over the storage medium area.

36. The playback system of claim 25, wherein the storage medium can move relative to the incident light.

37. A playback system comprising:
a light source for producing a coherent light beam, wherein the coherent light beam is directed incident to a first side of a holographic storage medium during a playback operation;
a surface operable to reflect at least a portion of the coherent light beam incident to and transmitted through the storage medium back into the storage medium from a second side, the second side generally opposite the first side; and
a detector for detecting diffracted holograms on the same side of the storage medium as the incident beam, where the detected hologram is diffracted from either the incident beam or the beam reflected back into the media by the reflective layer, but not from both beams, the hologram diffracting in response to a readout reference beam incident the holographic recording material such that the angle of the incident readout reference beam or the angle of the reflected readout reference beam from the reflective layer matches a recording reference angle relative to the holographic recording layer.

38. The playback system of claim 37, further including a means for shaping the coherent light into a plane wave beam.

39. The playback system of claim 37, further including a polytopic filter (an aperture at a Fourier plane of the light from the diffracted hologram).

40. The playback system of claim 37, further including a means for changing the angle of the beam reflected back into the storage medium.

41. The playback system of claim 40, wherein the means for changing the angle of the reflected beam includes at least one lens on an actuator.

42. The playback system of claim 40, wherein the means for changing the angle of the reflected beam includes at least one mirror on an actuator.

43. The playback system of claim 40, wherein the means for changing the angle of the reflected beam allows control of the beam angle in two dimensions.

44. The playback system of claim 37, further including a means for changing the wavelength of the incident beam on the storage medium.

45. The playback system of claim 37, wherein the means for producing coherent light includes at least one element that is tunable in wavelength.

46. The playback system of claim 37, wherein the means for detecting holograms is performed without any lenses between the storage medium and the detection device.

47. The playback system of claim 37, wherein the means for producing coherent light and the means for detecting holograms are contained in a head that can move over the storage medium area.

48. The playback system of claim 37, wherein the storage medium can move relative to the incident light.

* * * * *